(12) United States Patent
Koyama et al.

(10) Patent No.: US 10,220,670 B2
(45) Date of Patent: Mar. 5, 2019

(54) VEHICLE

(71) Applicant: HONDA MOTOR CO., LTD., Tokyo (JP)

(72) Inventors: Rieko Koyama, Wako (JP); Kenta Sugitate, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/460,241

(22) Filed: Mar. 16, 2017

(65) Prior Publication Data

US 2017/0267059 A1 Sep. 21, 2017

(30) Foreign Application Priority Data

Mar. 17, 2016 (JP) ................................. 2016-053290

(51) Int. Cl.
*B60H 1/00* (2006.01)
*B60H 1/24* (2006.01)
(Continued)

(52) U.S. Cl.
CPC ..... *B60H 1/00278* (2013.01); *B60H 1/00564* (2013.01); *B60H 1/246* (2013.01); *B60H 1/3407* (2013.01); *B60K 1/04* (2013.01); *B60L 11/1874* (2013.01); *B60L 11/1877* (2013.01); *B60N 3/042* (2013.01); *B60N 3/048* (2013.01); *B60R 13/025* (2013.01); *B62D 25/025* (2013.01); *B62D 25/04* (2013.01); *B62D 25/20* (2013.01); *B62D 25/2063* (2013.01); *B62D 27/02* (2013.01); *B62D 27/065* (2013.01); *H01M 10/613* (2015.04); *H01M 10/625* (2015.04); *H01M 10/6561* (2015.04); *B60H 2001/003* (2013.01); *B60K 11/06* (2013.01); *B60K 2001/005* (2013.01); *B60K 2001/0422* (2013.01); *B60Y 2306/05* (2013.01); *B60Y 2306/07* (2013.01)

(58) Field of Classification Search
CPC ................ B60H 1/00278; B60H 1/246; B60H 1/00014; B60H 1/004; B60K 11/06; B60K 1/04
See application file for complete search history.

(56) References Cited

U.S. PATENT DOCUMENTS 3,455,595 A * 7/1969 Eggert, Jr. ........... B60H 1/0055
296/208
6,315,069 B1 * 11/2001 Suba ....................... B60K 1/04
180/68.5
(Continued)

FOREIGN PATENT DOCUMENTS

WO WO 2013/030890 3/2013

*Primary Examiner* — Hau V Phan
(74) *Attorney, Agent, or Firm* — Mori & Ward, LLP

(57) ABSTRACT

A vehicle includes a battery module and an exhaust duct to discharge air from the battery module. A first side member is provided along a first side trim to provide a space between the first side member and the first side trim in a vehicle width direction. The space is connected to the battery module via the exhaust duct. A rear seat is provided in a vehicle interior. A first exhaust port is connected to the exhaust duct via the space and provided in the vehicle interior below the rear seat in a vehicle height direction. A second exhaust port is connected to the exhaust duct via the space and provided in the vehicle interior behind the rear seat in a front-rear direction. The air is discharged from the exhaust duct through the first exhaust port and the second exhaust port via the space.

15 Claims, 14 Drawing Sheets

(51) Int. Cl.
*B60H 1/34* (2006.01)
*B60K 1/04* (2019.01)
*B60L 11/18* (2006.01)
*B60N 3/04* (2006.01)
*B60R 13/02* (2006.01)
*B62D 25/02* (2006.01)
*B62D 25/04* (2006.01)
*B62D 25/20* (2006.01)
*B62D 27/02* (2006.01)
*B62D 27/06* (2006.01)
*H01M 10/625* (2014.01)
*H01M 10/6561* (2014.01)
*H01M 10/613* (2014.01)
*B60K 1/00* (2006.01)
*B60K 11/06* (2006.01)

(56) References Cited

U.S. PATENT DOCUMENTS

| | | | | |
|---|---|---|---|---|
| 7,048,321 B2* | 5/2006 | Bandoh | ............ | B60N 2/468 180/68.5 |
| 7,678,494 B2* | 3/2010 | Tsuchiya | ............ | B60L 11/1874 180/68.5 |
| 8,875,827 B2* | 11/2014 | Watanabe | ............ | B60K 1/04 180/68.1 |
| 9,343,789 B2* | 5/2016 | Yu | ............ | H01P 1/20381 |
| 2007/0292752 A1* | 12/2007 | Tsuchiya | ............ | B60L 11/1874 429/120 |
| 2009/0183935 A1* | 7/2009 | Tsuchiya | ............ | B60K 1/04 180/68.1 |
| 2011/0165830 A1* | 7/2011 | Smith | ............ | B60H 1/00278 454/75 |
| 2011/0239659 A1* | 10/2011 | Lior | ............ | B60H 1/004 60/783 |
| 2011/0298241 A1* | 12/2011 | Varns | ............ | B60H 1/00014 296/64 |
| 2012/0111528 A1* | 5/2012 | Takeuchi | ............ | B60K 1/04 165/41 |
| 2014/0182957 A1* | 7/2014 | Honda | ............ | B60K 11/06 180/68.1 |
| 2014/0196866 A1* | 7/2014 | Bezzina | ............ | B60H 1/00278 165/42 |
| 2015/0060168 A1* | 3/2015 | Janarthanam | ............ | B60H 1/00278 180/68.2 |

* cited by examiner

VEHICLE

CROSS-REFERENCES TO RELATED APPLICATIONS

The present application claims priority under 35 U.S.C. § 119 to Japanese Patent Application No. 2016-053290, filed Mar. 17, 2016, entitled "Vehicle." The contents of this application are incorporated herein by reference in their entirety.

BACKGROUND

1. Field

The present disclosure relates to a vehicle.

2. Description of the Related Art

A battery module (a high-voltage battery) that supplies electric power to a motor is disposed in a vehicle, such as a hybrid vehicle or an electric vehicle that uses motor power to travel. For example, International Publication No. 2013/030890 discloses a vehicle including a battery module disposed inside a vehicle interior, and an exhaust duct (or exhaust ducts) that exhausts air that has cooled the battery module (hereinafter, as appropriate, referred to as the air that has cooled the battery). The exhaust duct (or exhaust ducts) is connected to a space inside a pillar, a space formed by a side frame and a step member, or a space formed by the side frame and a scuff plate, and the air that has cooled the battery and that is discharged from the exhaust duct (or exhaust ducts) is discharged into the vehicle interior through the above spaces.

SUMMARY

According to one aspect of the present invention, a vehicle includes a floor panel, a battery module disposed inside a vehicle interior, an exhaust duct that is arranged above the floor panel and that discharges air that has cooled the battery module, in which the exhaust duct is connected to side trims on both sides, and air that has been discharged from the exhaust duct is discharged into the vehicle interior from below a rear seat and from a rearward position with respect to the rear seat through spaces formed between side members and the side trims.

According to another aspect of the present invention, a vehicle includes a battery module, an exhaust duct, a first side trim, a second side trim, a first side member, a second side member, a rear seat, a first exhaust port, and a second exhaust port. The battery module is provided in a vehicle interior. The exhaust duct is to discharge air from the battery module. The second side trim is opposite to the first side trim in a vehicle width direction perpendicular to a front-rear direction of the vehicle. The second side member is opposite to the first side member in the vehicle width direction. The first side member is provided along the first side trim to provide a space between the first side member and the first side trim in the vehicle width direction. The space is connected to the battery module via the exhaust duct. The rear seat is provided in the vehicle interior. The first exhaust port is connected to the exhaust duct via the space and provided in the vehicle interior below the rear seat in a vehicle height direction perpendicular to the vehicle width direction and the front-rear direction. The second exhaust port is connected to the exhaust duct via the space and provided in the vehicle interior behind the rear seat in the front-rear direction. The air is discharged from the exhaust duct through the first exhaust port and the second exhaust port via the space.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
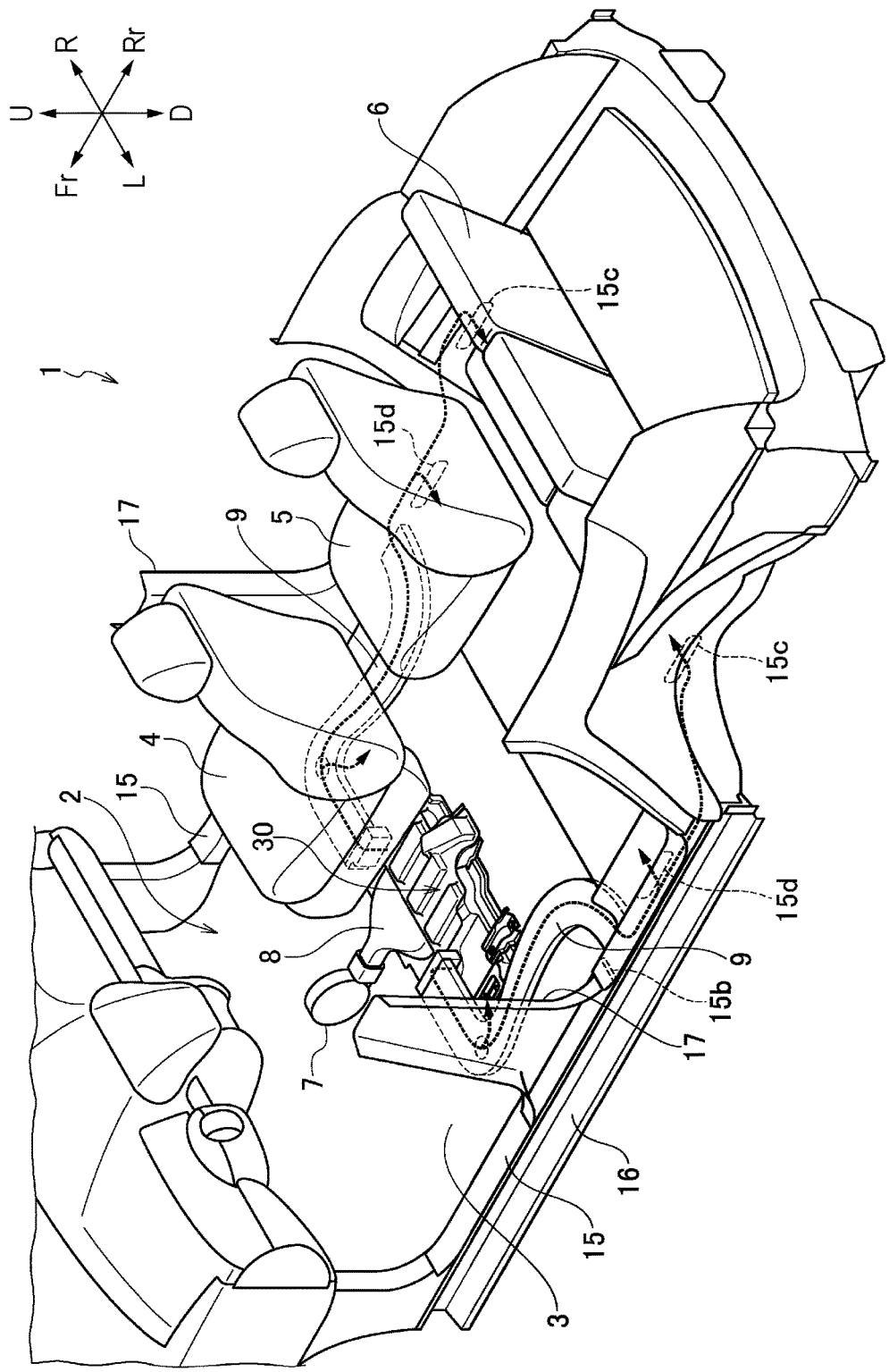
FIG. 1 is a perspective view illustrating an arrangement of main components of a vehicle interior of a vehicle according to an exemplary embodiment of the present disclosure and is a drawing in which a left front seat and a left rear seat are omitted.

The embodiment(s) will now be described with reference to the accompanying drawings, wherein like reference numerals designate corresponding or identical elements throughout the various drawings.

Hereinafter, a vehicle of an exemplary embodiment of the present disclosure will be described with reference to the drawings. Note that the drawings are to be viewed while referring to the orientations of the signs, and in the following description, the directions such as the up and down, the left and right, and the forward and rear are based on the view of the driver. In the drawings, the front side of the vehicle is denoted as Fr, the rear side as Rr, the left side as L, the right side as R, the upper side as U, and the lower side as D.

As illustrated in FIG. 1, a vehicle 1 of the present exemplary embodiment includes, on a floor panel 3 that constitutes a floor portion of a vehicle interior 2, left and right front seats 4, left and right rear seats 5, foldable left and right third row seats 6, and a battery unit 30 that supplies electric power to a motor (not shown) and the like.

Figure 2:
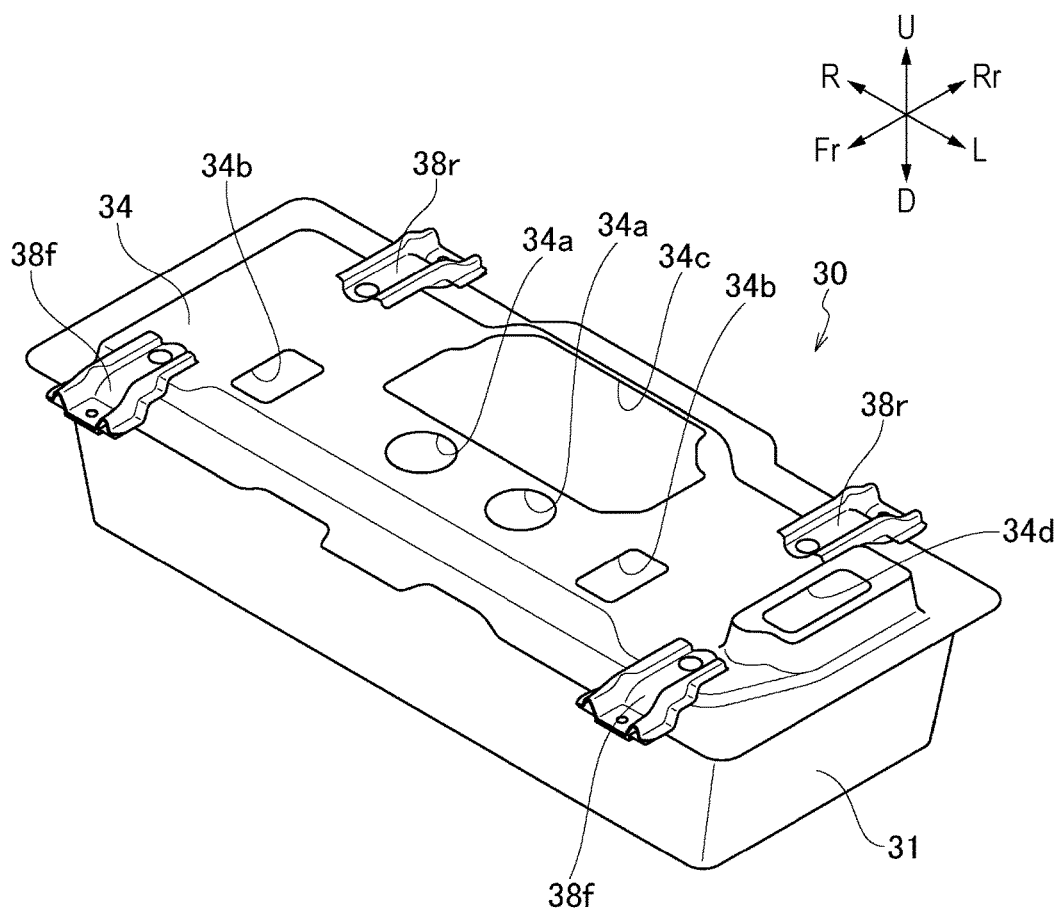
FIG. 2 is a perspective view of a battery unit according to the exemplary embodiment of the present disclosure.
Figure 3:
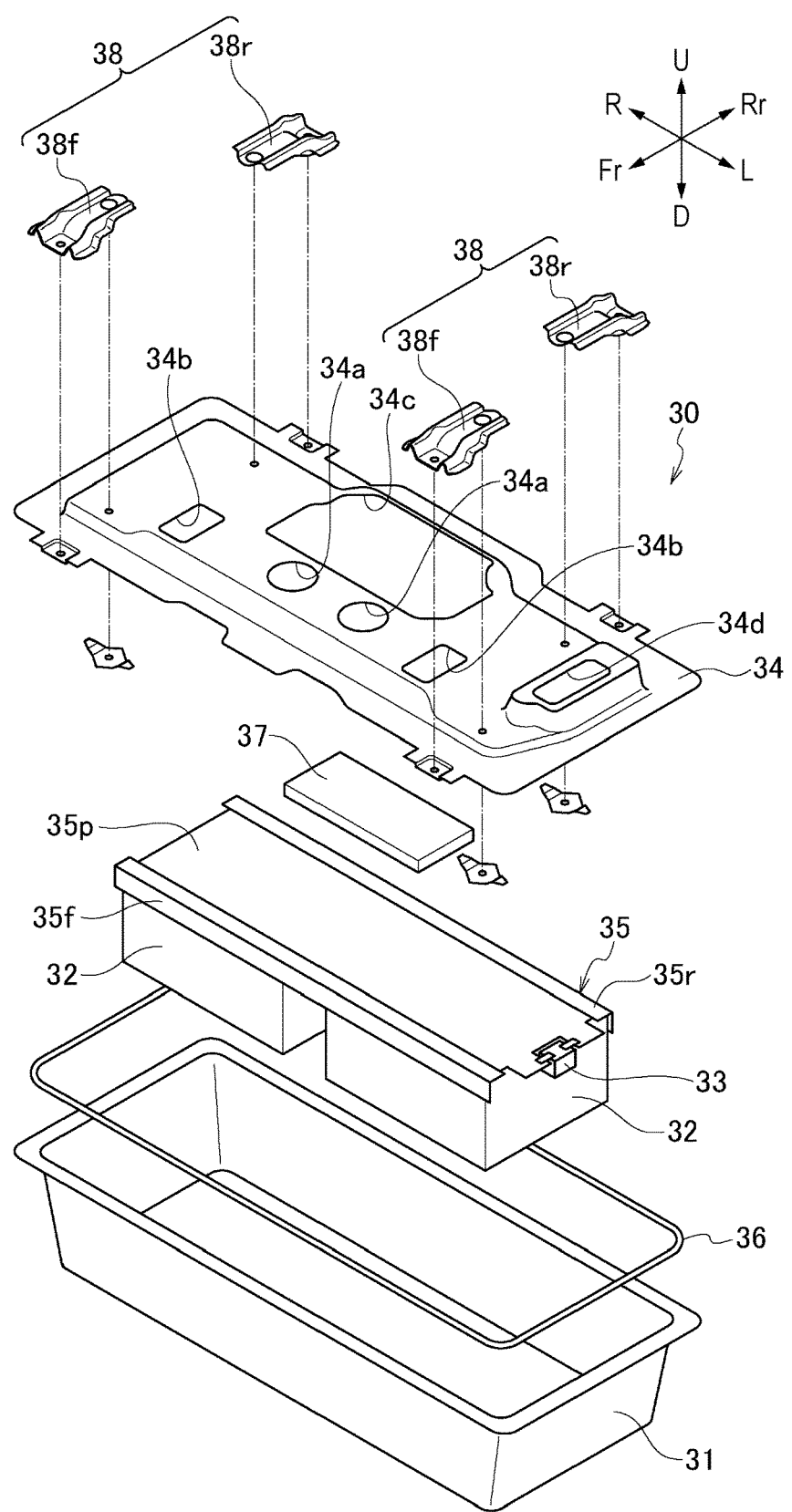
FIG. 3 is an exploded perspective view of the battery unit according to the exemplary embodiment of the present disclosure.
Figure 4:
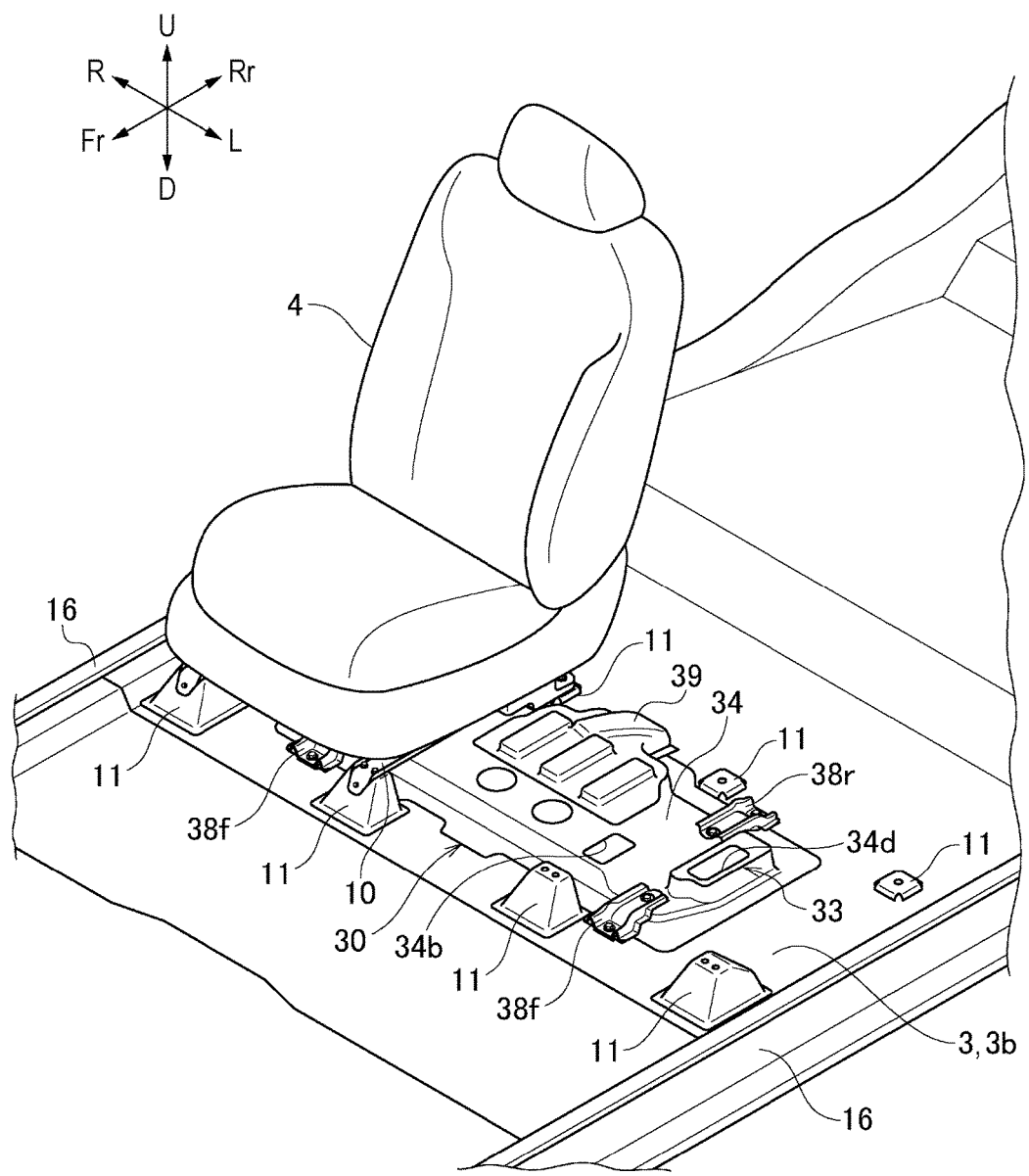
FIG. 4 is a perspective view illustrating a battery unit disposing portion of the vehicle according to the exemplary embodiment of the present disclosure viewed from the upper front side and is a drawing in which a left front seat is omitted.

As illustrated in FIGS. 2 and 3, the battery unit 30 includes a battery case 31 that has a rectangular parallelepiped shape that is long in the left-right direction in plan view, battery modules 32, a battery ECU 37, a battery cooling duct (not shown), and a plug 33 for maintenance and inspection that are accommodated in the battery case 31, and a battery cover 34 that covers an upper opening of the battery case 31.

The two battery modules 32 aligned left and right are accommodated in the battery unit 30 of the present exemplary embodiment, and the left and right battery modules 32 are connected to each other in an integrated manner by an upper frame member 35 that has a relatively high rigidity. The upper frame member 35 includes a pair of cross frames 35f and 35r that each have a substantially L-shaped cross section, and a rectangular upper panel 35p that covers upper surfaces of the two battery modules 32. The cross frame 35f is fixed to a front end portion of the upper panel 35p, and the cross frame 35r is fixed to a rear end portion of the upper panel 35p, such that a partially closed cross section is formed. The battery modules 32 output electricity to a portion external to the battery unit 30 through the battery ECU 37 that controls the charging and discharging of the battery modules 32.

The battery cooling duct is configured such that air (cold air of an air conditioner, for example) introduced from a cooling fan 7 illustrated in FIG. 1 into the battery unit 30 through an introduction duct 8 cools the battery modules 32. The air after cooling is discharged into the vehicle interior 2 through exhaust ducts 9.

The battery cover 34 covers the upper opening of the battery case 31 in a hermetically sealed state while having a sealing member 36 in between. The battery cover 34 integrally includes left and right front fixing members 38f welded to the front end portion thereof and left and right rear fixing members 38r welded to the rear end portion thereof. The battery cover 34 is fixed to the floor panel 3 through the fixing members 38.

Two air introduction ports 34a to which the introduction duct 8 is connected, two air exhaust ports 34b to which the exhaust ducts 9 are connected, an ECU access port 34c for accessing the battery ECU 37 from a portion external to the battery unit 30, and a plug access port 34d for accessing the maintenance and inspection plug 33 from a portion external to the battery unit 30 are formed in the battery cover 34.

The ECU access port 34c and the plug access port 34d are normally covered by detachable access covers 39 and 40 (see FIG. 7), respectively. The ECU access port 34c or the plug access port 34d is opened by removing the access cover 39 or 40; accordingly, access to the battery ECU 37 or the maintenance and inspection plug 33 is enabled.

The maintenance and inspection plug 33 is an operation tool for blocking the output of electricity from the battery modules 32 when maintenance and inspection of the vehicle 1 is performed. The maintenance and inspection plug 33 is disposed inside the battery case 31 and on the left side in the vehicle width direction and is operated from the outside of the battery unit 30 through the plug access port 34d of the battery cover 34.

As illustrated in FIGS. 4 to 7, the battery unit 30 is disposed in a battery accommodating recess 3a (see FIG. 6) provided under the front seats 4 and in the floor panel 3 in a recessed manner. The battery unit 30 disposed in the battery accommodating recess 3a is fixed to the floor panel 3 by being fastened to the floor panel 3 with the fixing members 38 provided in the battery cover 34.

Left and right seat rails 10 that movably support the front seat 4 in the vehicle front-rear direction and pairs of front and rear reinforcing portions 11 that support the front end portions and the rear end portions of the seat rails 10 are provided under each of the left and right front seats 4. The seat rails 10 and the reinforcing portions 11 have high rigidity so as to support the loads of the front seats 4 and the driver, and the reinforcing portions 11 are firmly fixed to the floor panel 3 by welding and the like. Furthermore, each seat rail 10 is held by being bridged across the corresponding front and rear reinforcing portions 11 provided so as to protrude upwards from a floor surface 3b of the floor panel 3.

Figure 5:
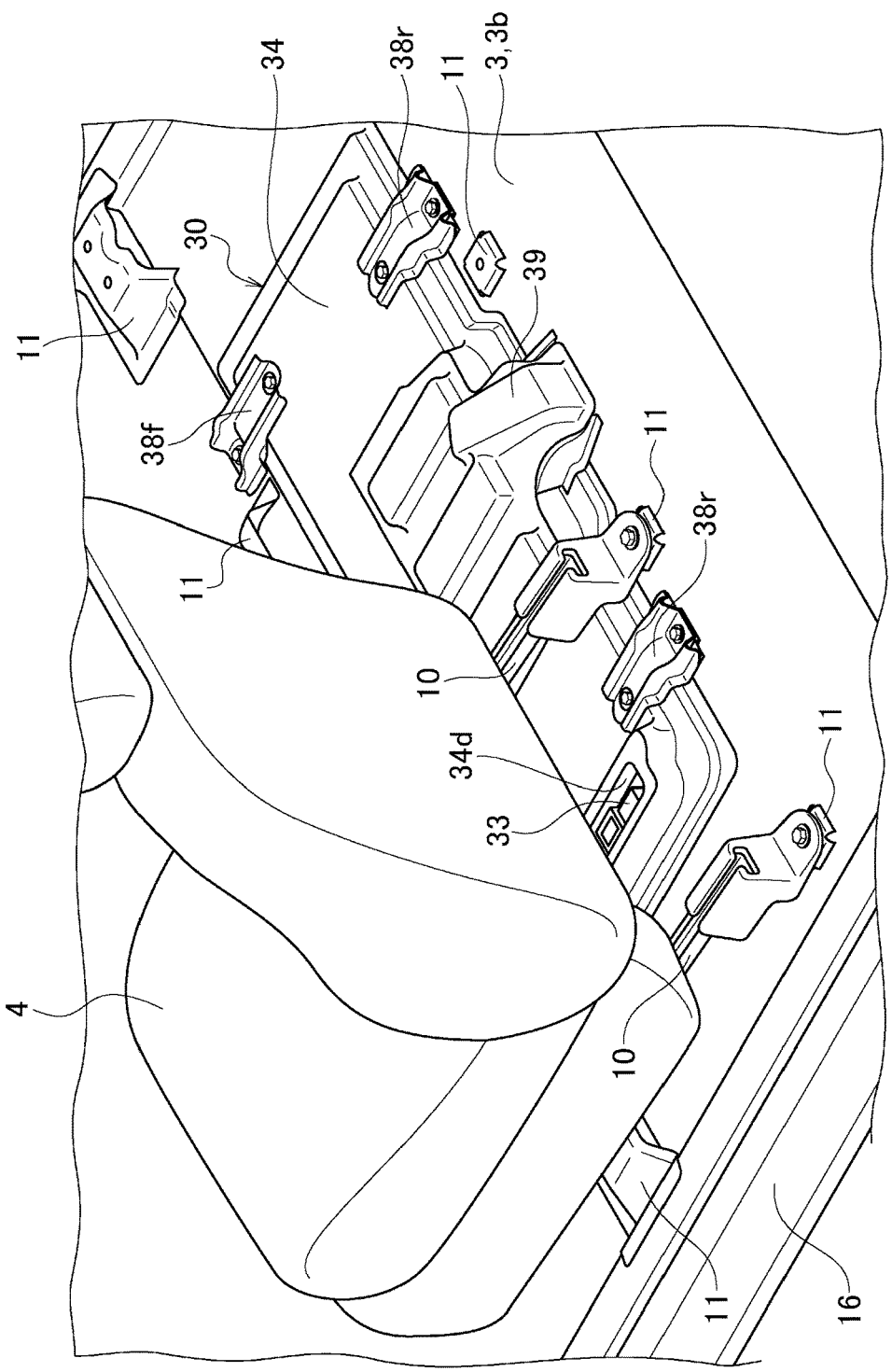
FIG. 5 is a perspective view illustrating the battery unit disposing portion of the vehicle according to the exemplary embodiment of the present disclosure viewed from the upper rear side and is a drawing in which a right front seat is omitted.
Figure 6:
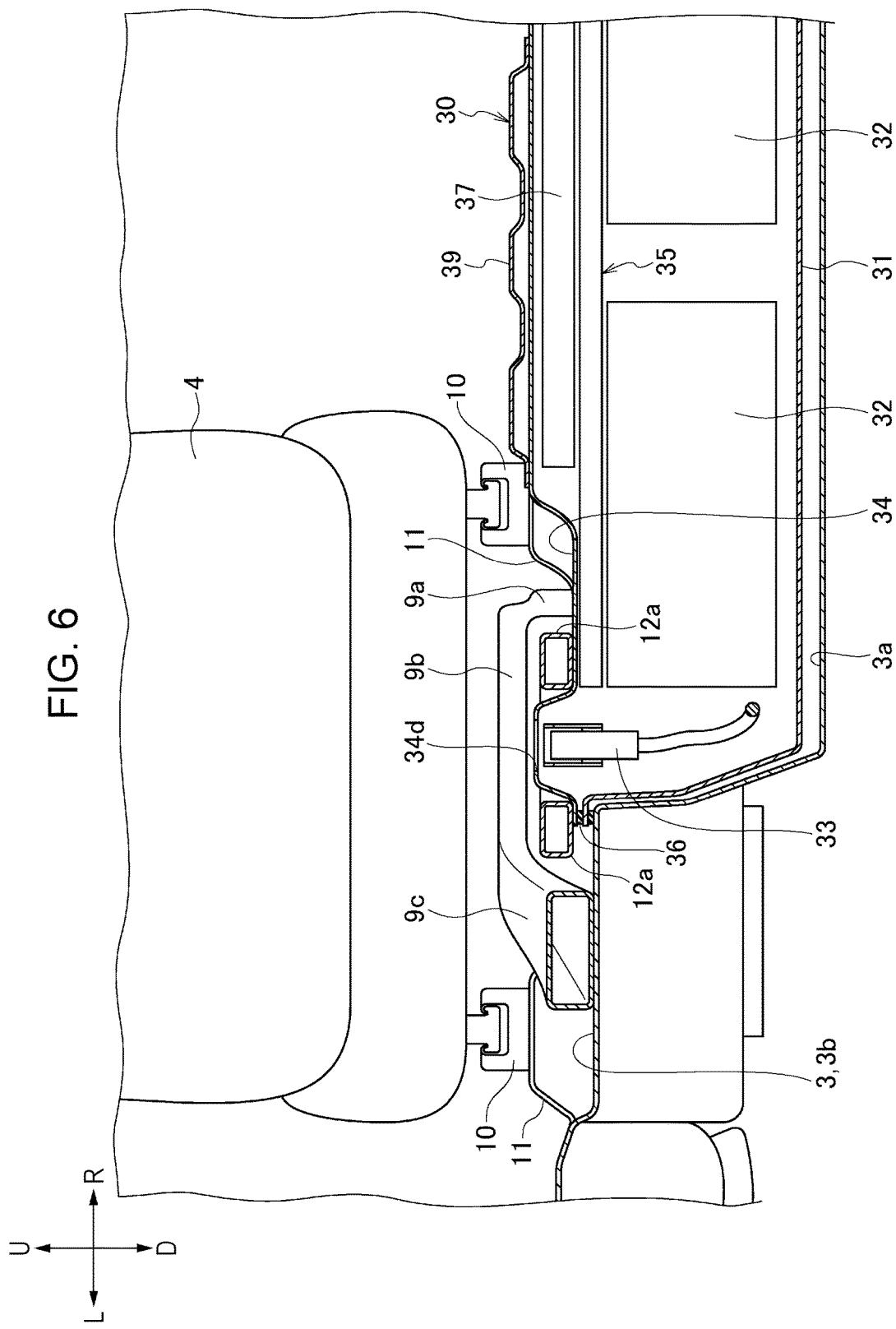
FIG. 6 is a cross-sectional view taken along line VI-VI in FIG. 7.

The position of the maintenance and inspection plug 33 in the front-rear direction is set so that the plug 33 can be accessed by moving the front seat 4 forward along the seat rails 10. In other words, while the maintenance and inspection plug 33 is hidden by the front seat 4 at normal times, when performing maintenance and inspection, as illustrated in FIG. 5, the maintenance and inspection plug 33 can be accessed by moving the front seat 4 forward.

Figure 7:
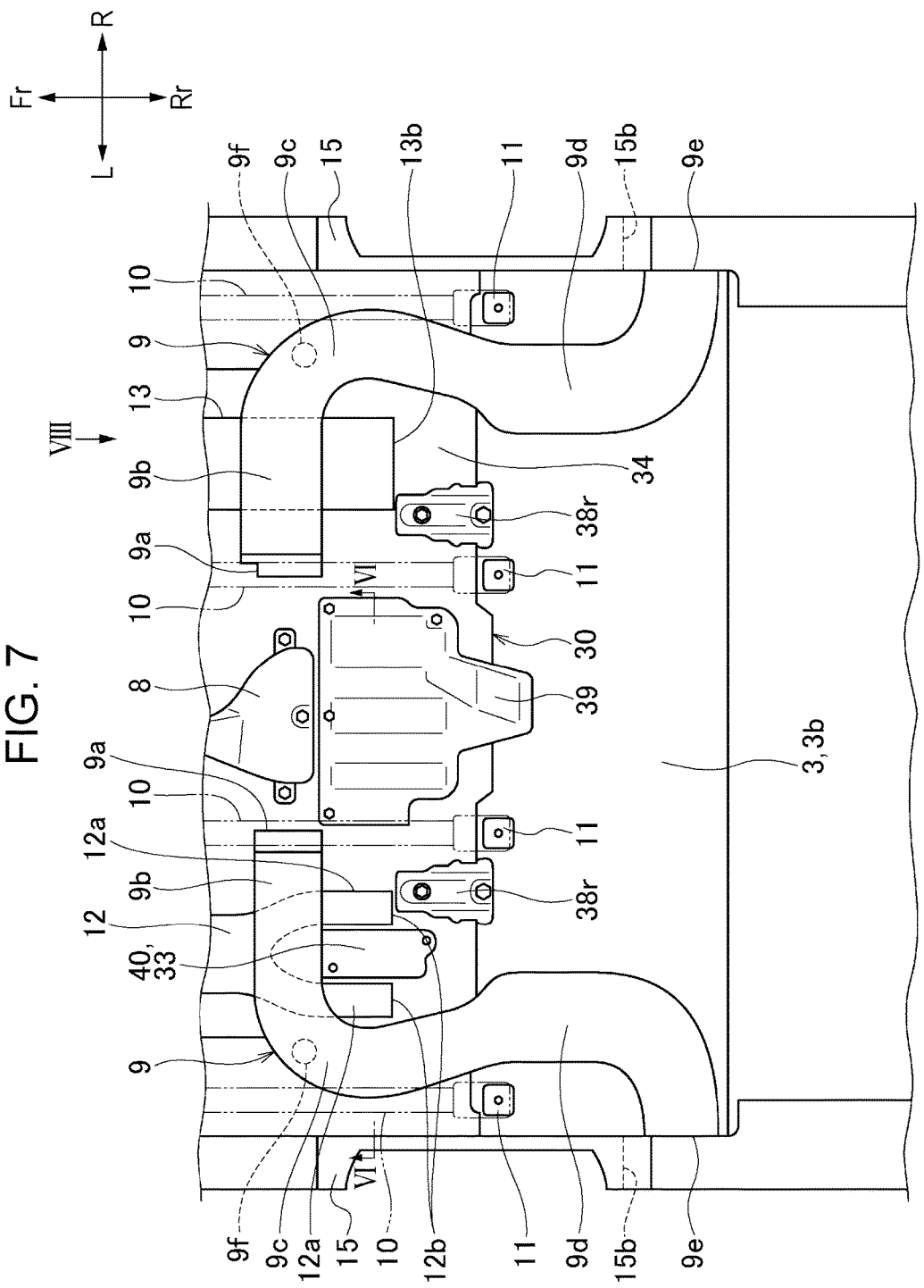
FIG. 7 is a plan view illustrating the battery unit disposing portion of the vehicle according to the exemplary embodiment of the present disclosure.
Figure 8:
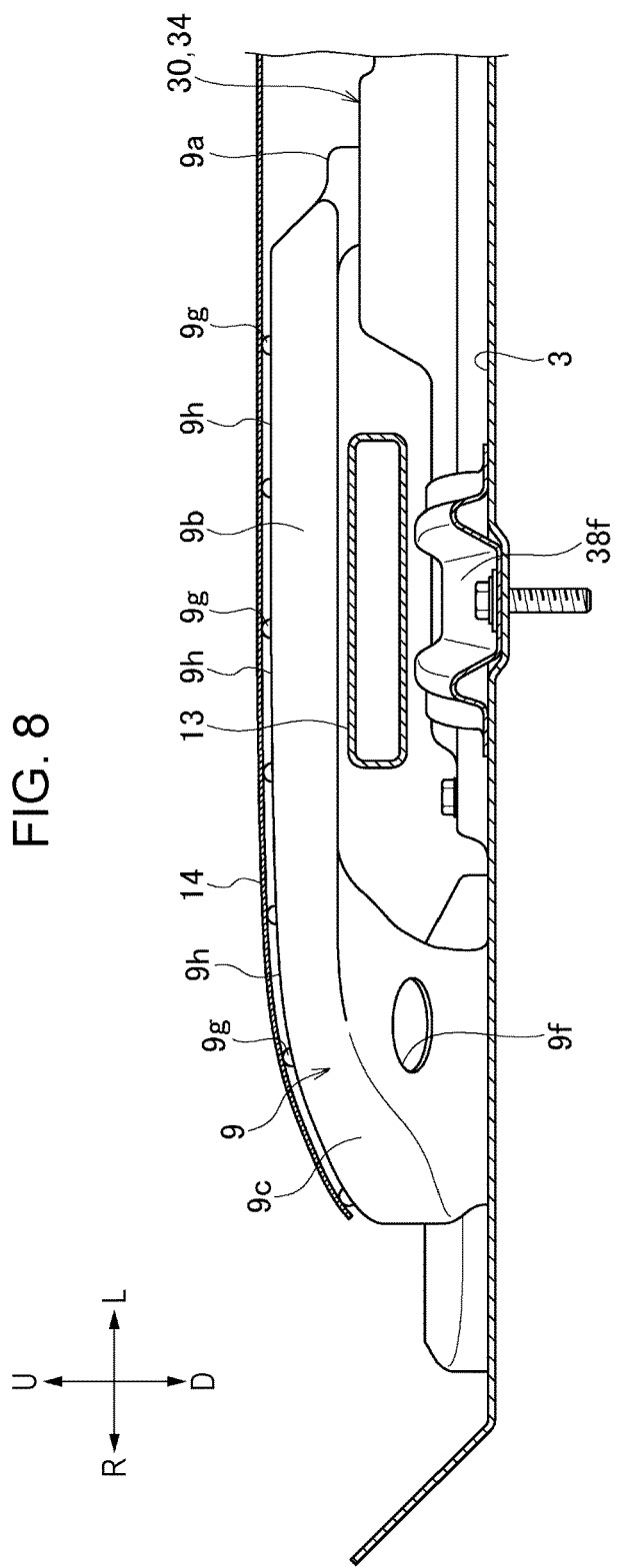
FIG. 8 is a front view illustrating the battery unit disposing portion viewed from under the right front seat (from an arrow VIII in FIG. 7) of the vehicle according to the exemplary embodiment of the present disclosure.
Figure 9:
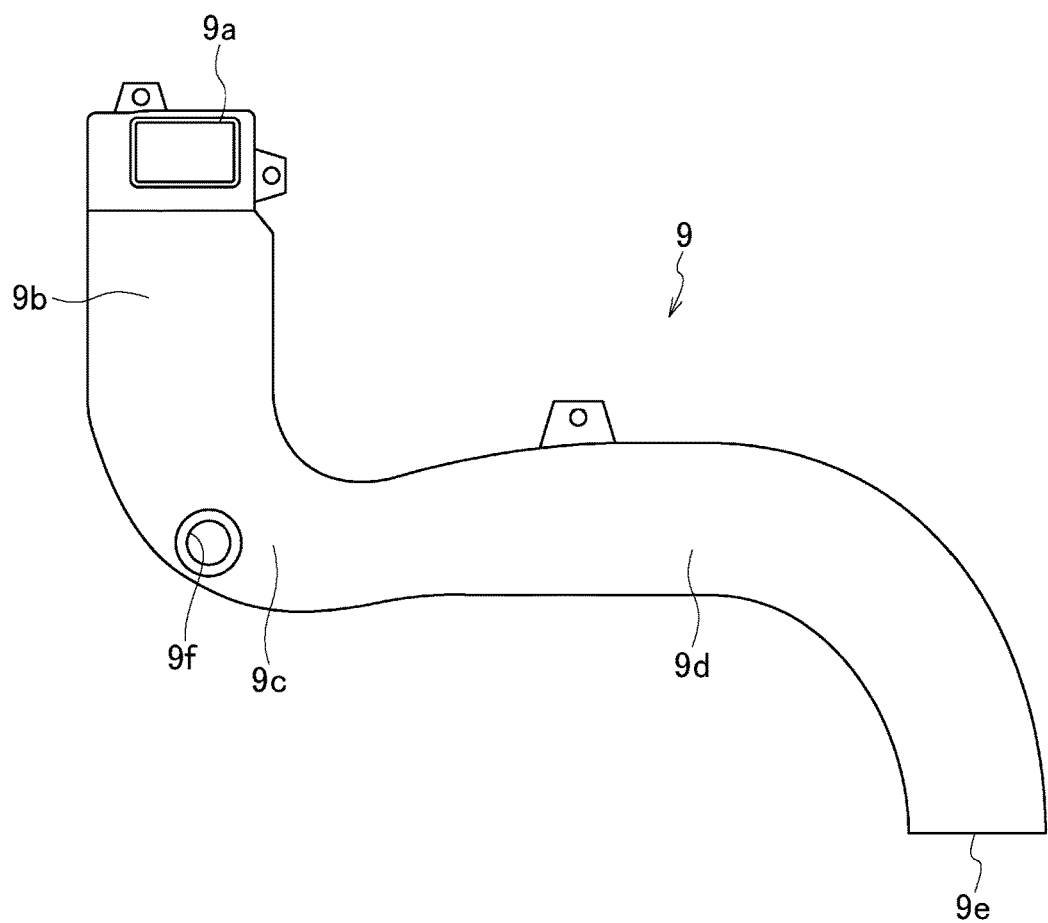
FIG. 9 is a bottom view of an exhaust duct according to the exemplary embodiment of the present disclosure.

As illustrated in FIG. 7, a pair of left and right heater ducts 12 and 13 that extend in the vehicle front-rear direction are disposed under the left and right front seats 4 and above the battery cover 34 (or the floor panel 3). The left and right heater ducts 12 and 13 discharge hot air from the air conditioner that is connected to the front ends thereof towards the foot space of the rear seats 5 from discharge ports 12b and 13b at the rear ends thereof. Furthermore, the left and right heater ducts 12 and 13 each have a wide and flat shape so as to, while securing the needed cross-sectional areas of the flow paths, restrict the height dimension thereof.

Among the left and right heater ducts 12 and 13, the heater duct 12 on the left side includes left and right branch portions 12a that are branched to the left and right at the rear end side of the heater duct 12. The maintenance and inspection plug 33 is disposed so as to be positioned between the left and right branch portions 12a. With the above, the maintenance and inspection plug 33 can be accessed without dismounting the heater duct 12.

As illustrated in FIGS. 7 to 11, the left and right exhaust ducts 9 are disposed so as to be substantially symmetrical to each other with respect to the center of the vehicle, and each have a wide and flat shape so as to, while securing the needed cross-sectional areas of the flow paths, restrict the height dimension thereof. Specific components of the exhaust ducts 9 include battery connecting portions 9a connected to the air exhaust ports 34b of the battery cover 34, vehicle width direction extension portions 9b provided so as to extend outwards from the battery connecting portions 9a in the vehicle width direction, bend portions 9c that extend from outer end portions of the vehicle width direction extension portions 9b and along the inside of the seat rails 10 of the front seats 4 on the outer side in the vehicle width direction towards the rear of the vehicle, front-rear direction extension portions 9d that extend from the bend portions 9c towards the rear of the vehicle in the vehicle front-rear direction, first exhaust ports 9e that are formed at the rear ends of the front-rear direction extension portions 9d and that are connected to side trims 15 at lower portions of pillar portions 17 (see FIG. 1) provided at the sides of the front seats 4 and in the foot space of the rear seats 5, and second exhaust ports 9f that are formed in the undersides of the bend portions 9c so as to oppose the floor panel 3 and that discharge air, which has cooled the battery, towards the floor panel 3.

The vehicle width direction extension portions 9b of the exhaust ducts 9 are disposed so as to intersect the upper portions of the heater ducts 12 and 13 in order to avoid interfering the heater ducts 12 and 13 at portions under the front seats 4. Furthermore, in intersecting the upper portion of the heater duct 12, the vehicle width direction extension portion 9b of the exhaust duct 9 on the left side that is among the left and right exhaust ducts 9 is disposed so as to pass the upper front side of the maintenance and inspection plug 33 (the plug access port 34d). With the above, the maintenance and inspection plug 33 can be accessed without dismounting the exhaust ducts 9.

Figure 10:
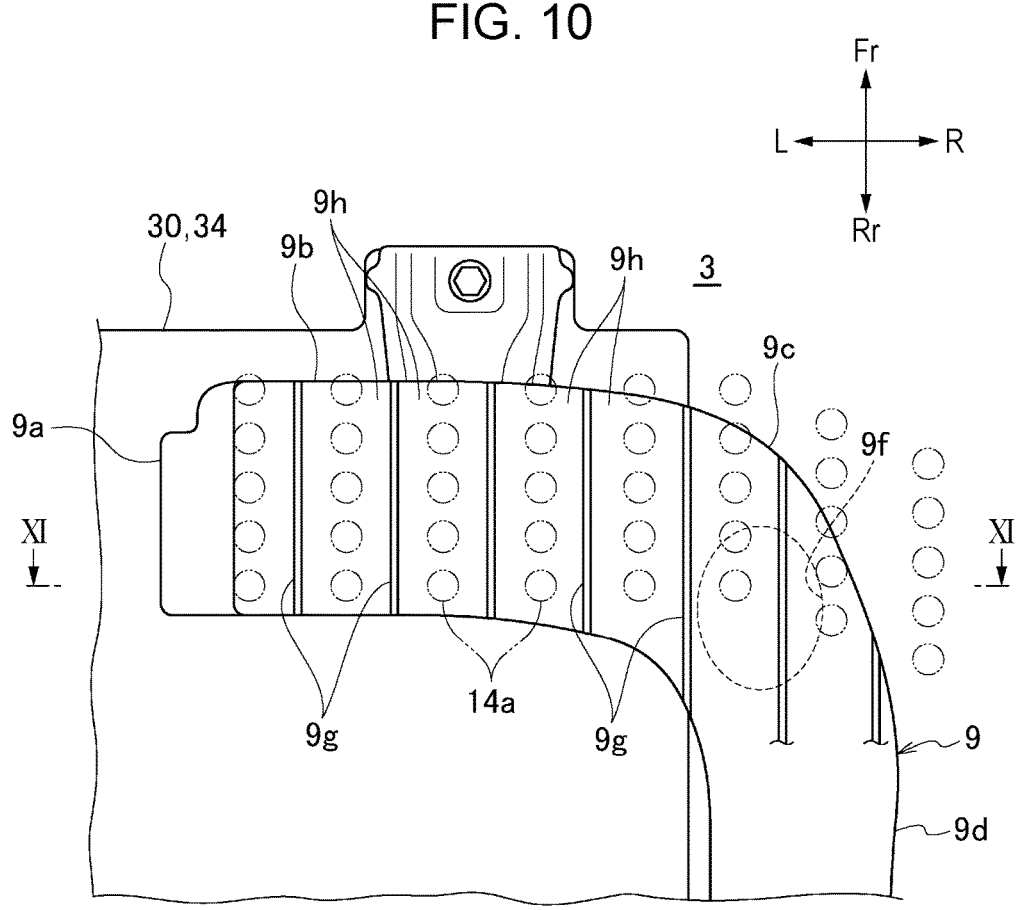
FIG. 10 is a plan view of an essential portion of the exhaust duct according to the exemplary embodiment of the present disclosure illustrating a positional relationship between second exhaust ports and ventilation holes of a carpet.

The exhaust ducts 9 are disposed between a carpet 14, which is disposed above the floor panel 3, and the floor panel 3. As illustrated in FIG. 10, a plurality of ventilation holes 14a arranged in the vehicle width direction and the vehicle front-rear direction are formed in the carpet 14 under the front seats 4 and in areas covering the vehicle width direction extension portions 9b and the bend portions 9c of the exhaust ducts 9 from above. Meanwhile, in the exhaust ducts 9, a plurality of protrusions 9g that have a rib shape extending along the vehicle front-rear direction and that are aligned in a parallel manner in the vehicle width direction are formed on the upper surfaces of the vehicle width direction extension portions 9b and the bend portions 9c that are covered by the carpet 14. Recesses 9h are formed between adjacent protrusions 9g, and the carpet 14 being supported by the protrusions 9g forms spaces with the protrusions 9g adjacent to the carpet 14 and the recesses 9h. As described above, by securing spaces between the upper surfaces of the exhaust ducts 9 and the carpet 14, the ventilation holes 14a of the carpet 14 are prevented from being blocked by the upper surfaces of the exhaust ducts 9.

Figure 11:
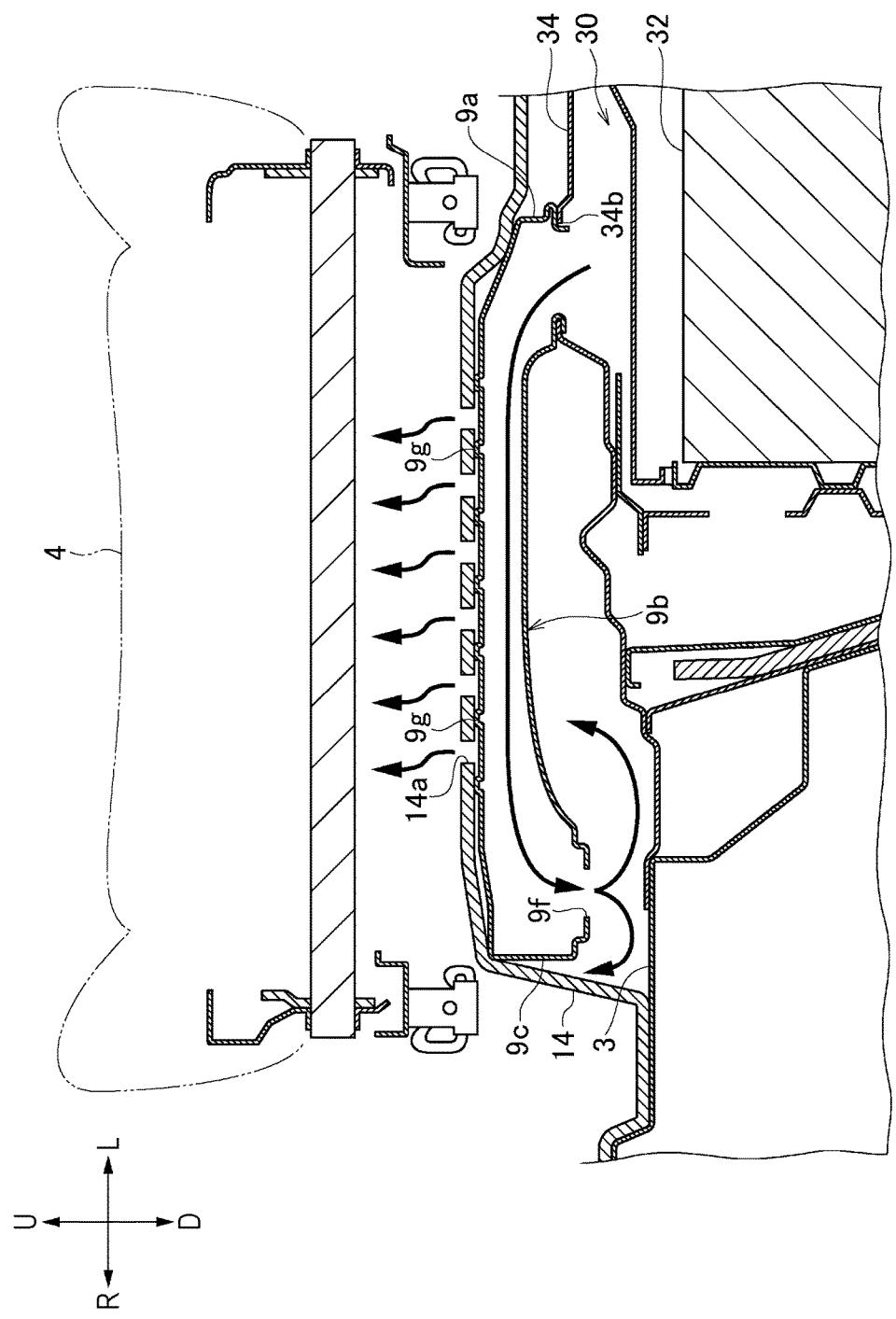
FIG. 11 is a cross-sectional view taken along line XI-XI in FIG. 10.

As illustrated in FIGS. 7 and 11, the bend portions 9c of the exhaust ducts 9 are positioned near the side trims 15 that are positioned under the front seats 4 and that cover the upper side and the inner side of side members 16 (see FIG. 1, for example). The undersides of the bend portions 9c oppose the floor panel 3 at a predetermined interval, and the second exhaust ports 9f are formed in the above interval. The second exhaust ports 9f being formed in the bend portions 9c where swirl flows are easily generated can favorably discharge a portion of the air that has cooled the battery and that is flowing inside the exhaust ducts 9.

The air that has cooled the battery and that is discharged towards the floor panel 3 from the second exhaust ports 9f of the exhaust ducts 9 impinges on the floor panel 3 and flows along the floor panel 3 such that the air is dispersed. Subsequently, the air that has cooled the battery and that is filled in the spaces between the carpet 14 and the floor panel 3 is exhausted in a dispersed manner to the space under the front seats 4 through the plurality of ventilation holes 14a formed in the carpet 14.

The side members 16 are frame members that are provided at the two end portions of the vehicle 1 in the vehicle width direction and along substantially the whole area in the vehicle front-rear direction, and the side trims 15 are interior members that form the side walls on both sides of the vehicle interior 2 in the vehicle width direction. Accordingly, spaces S between the side members 16 and the side trims 15 are formed in substantially the whole area of the vehicle interior 2 in the vehicle front-rear direction. Partitioning walls 15b are provided in the spaces S and on the frontal side with respect to the positions where the first exhaust ports 9e of the exhaust ducts 9 are connected such that the air that has cooled the battery and that has flowed into the spaces S from the first exhaust ports 9e of the exhaust ducts 9 is not guided towards the front seats 4 side and the pillar portions 17 side. Accordingly, the air that has cooled the battery and that has flowed into the spaces S from the first exhaust ports 9e of the exhaust ducts 9 is guided along the spaces S and towards the vehicle rear side and is discharged into the vehicle interior 2 from the exhaust ports 15d and 15c formed in the side trims 15.

Figure 12:
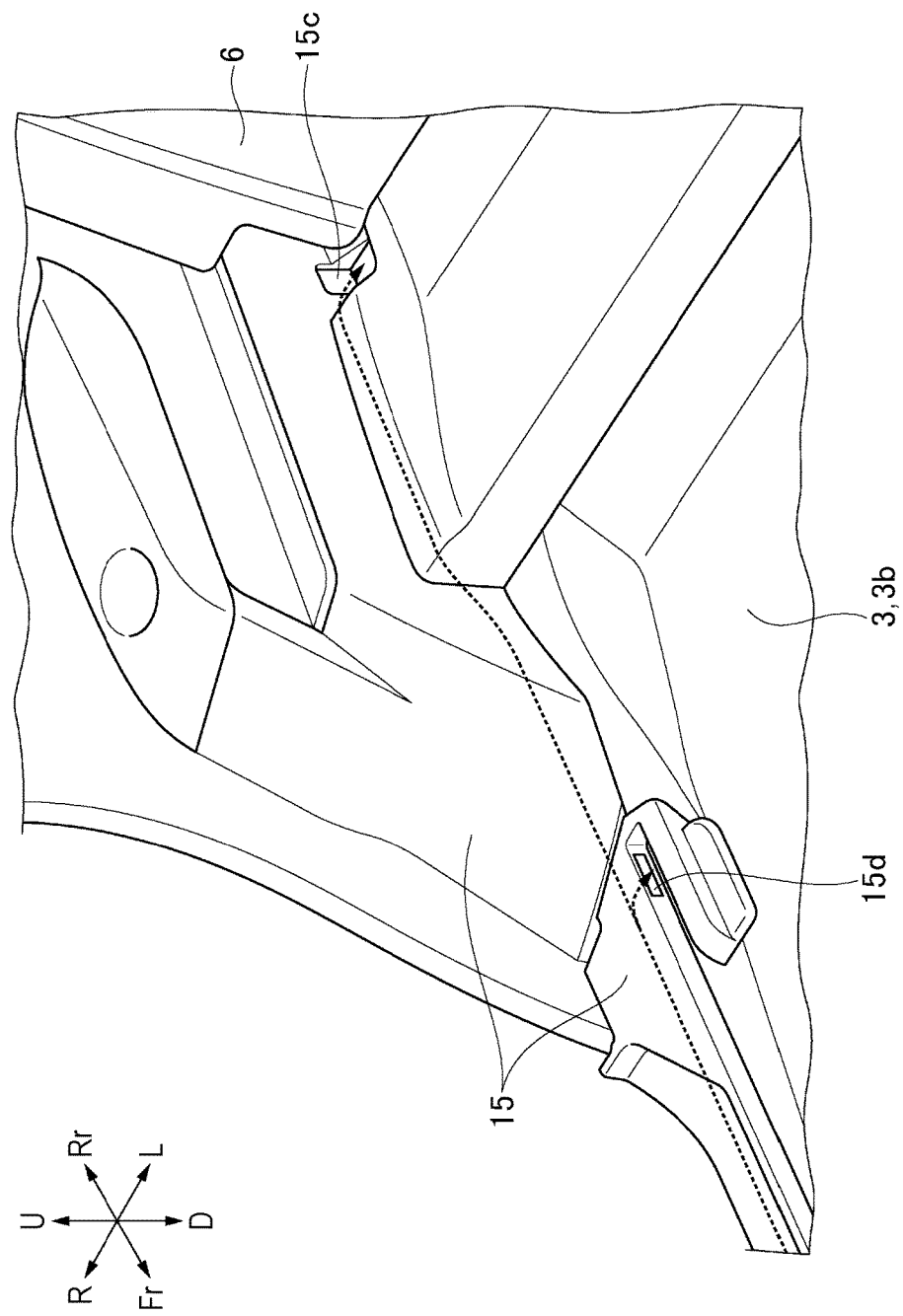
FIG. 12 is a perspective view of a portion under the rear seat and a portion on a side of the rearmost seat in FIG. 1, and is a diagram in which the rear seats are omitted.

As illustrated in FIGS. 1 and 12, the exhaust ports 15d are formed in the side trims 15 at positions below and at the sides of the rear seats 5, and the exhaust ports 15c are formed in the side trims 15 at positions at the sides of the third row seats 6. As illustrated by the arrows in FIGS. 1 and 12, the air that has cooled the battery passes through the spaces S between the side members 16 and the side trims 15 from the first exhaust ports 9e of the exhaust ducts 9 and is discharged into the spaces below the rear seats 5 and to the third row seats 6 from the exhaust ports 15d and 15c.

As described above, in the vehicle 1 of the present exemplary embodiment, since the air that has cooled the battery and that has been discharged from the exhaust ducts 9 is discharged into the vehicle interior 2 from below the rear seats 5 and from rearward portions with respect to the rear seats 5 through the spaces S formed between the side members 16 and the side trims 15, the air can be exhausted in a dispersed manner into a wide area inside the vehicle interior 2. With the above, discomfort caused to the occupant due to a local temperature increase caused by the air that has cooled the battery can be reduced. Furthermore, discomfort caused to the driver on the driver seat (the front seat 4), which is where the occupant is most likely to be seated, can be reduced by not discharging the air that has cooled the battery from a portion near the front seat 4. Moreover, the air that has cooled the battery can be suppressed from being discharged to the upper portion of the vehicle, which is where discomfort is easily felt, by guiding the air that has cooled the battery to the rear portion of the vehicle without having the air pass through the spaces inside the pillar portions 17.

Furthermore, since the exhaust ducts 9 include the first exhaust ports 9e provided at the duct end portions, and the second exhaust ports 9f provided in the undersides of the ducts between the battery connecting portions 9a and the duct end portions so as to oppose the floor panel 3, the air that has cooled the battery can be discharged from a plurality of positions even in a case of a single exhaust duct 9 that has no branch pipes. Furthermore, since the second exhaust ports 9f oppose the floor panel 3, the air that has cooled the battery not only can be discharged while suppressing pressure loss but can be dispersed by using the floor panel 3.

Furthermore, since the air that has cooled the battery and that has been discharged from the second exhaust ports 9f passes through the spaces between the floor panel 3 and the carpet 14 and is discharged into the vehicle interior 2 from the ventilation holes 14a formed in the carpet 14, the air that has cooled the battery can be exhausted in a further dispersed manner without causing discomfort to the occupant.

Furthermore, since the battery modules 32 are disposed under the front seats 4 and in the battery accommodating recess 3a provided in the floor panel 3 in a recessed manner, not only a large space can be secured inside the vehicle interior but the front seats 4 can be disposed at low positions.

The vehicle 1 according to a modification of the present disclosure will be described next with reference to FIGS. 13 and 14. However, components that are shared with the exemplary embodiment described above will be denoted with the reference numerals that are the same as those of the exemplary embodiment described above and redundant description of the exemplary embodiment described above will be omitted.

Figure 13:
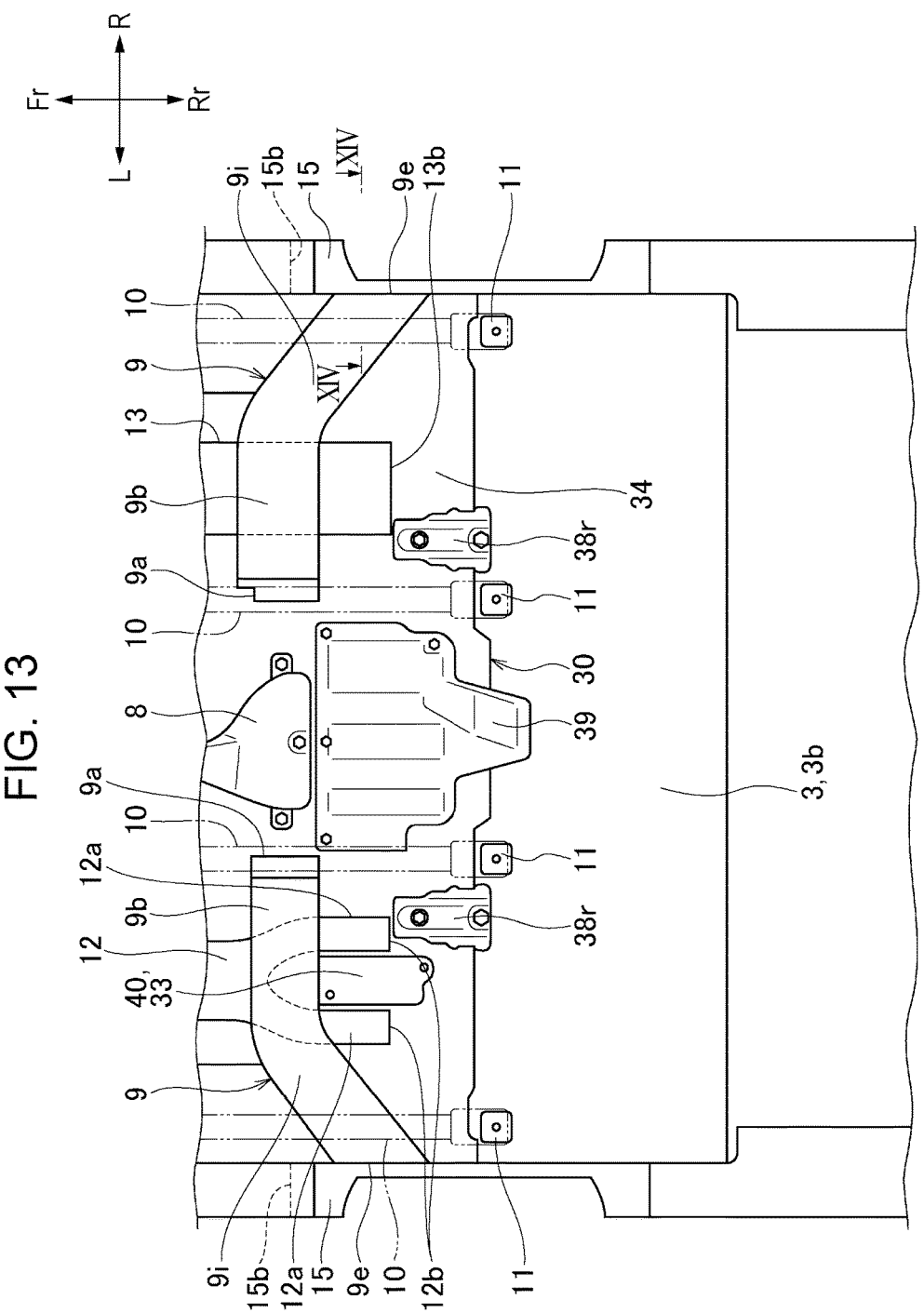
FIG. 13 is a plan view of an essential portion of the vehicle according to a second exemplary embodiment of the present disclosure.
Figure 14:
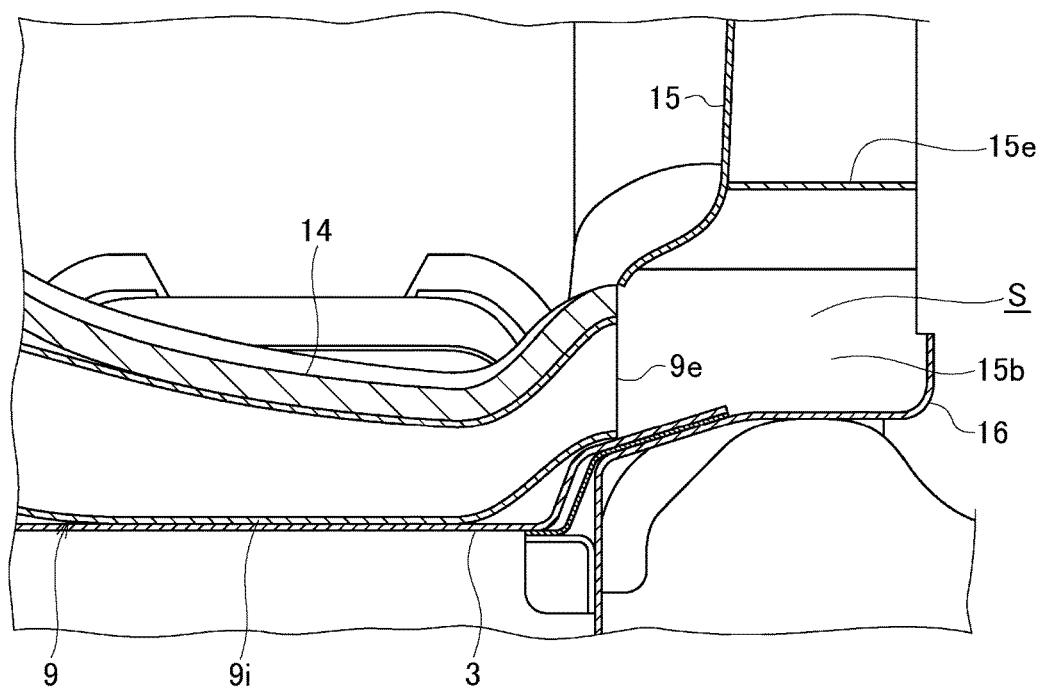
FIG. 14 is a cross-sectional view taken along line XIV-XIV in FIG. 13.

As illustrated in FIGS. 13 and 14, the first exhaust ports 9e of the exhaust ducts 9 are connected to the side trims 15 at front lower portions of the pillar portions 17 (see FIG. 1) provided at the sides of the front seats 4. In other words, the exhaust ducts 9 include battery connecting portions 9a connected to the air exhaust ports 34b of the battery cover 34, vehicle width direction extension portions 9b that extend from the battery connecting portions 9a towards the outside in the vehicle width direction, inclination portions 9i that incline towards the front lower portion of the pillar portions 17 from the outer end portions of the vehicle width direction extension portions 9b, and the first exhaust ports 9e connected to the side trims 15 at the front lower portions of the pillar portions 17.

The partitioning walls 15b that impede the flow of air towards the front seats 4 side are provided in the spaces S between the side members 16 and the side trims 15 that cover the side members 16 and on the frontal side with respect to the positions where the first exhaust ports 9e of the exhaust ducts 9 are connected and, further, partitioning walls 15e that impede the flow of air flowing upwards along the pillar portions 17 are provided in the side trims 15 that cover the pillar portions 17, such that the air that has cooled the battery and that has flowed into the spaces S from the first exhaust ports 9e of the exhaust ducts 9 is not guided towards the front seats 4 side and the pillar portions 17 side. Accordingly, the air that has cooled the battery and that has flowed into the spaces S from the first exhaust ports 9e of the exhaust ducts 9 is guided along the spaces S and towards the vehicle rear side and is discharged into the vehicle interior 2 from the exhaust ports 15d and 15c formed in the side trims 15 (see FIGS. 1 and 12).

Note that the present disclosure is not limited to the exemplary embodiment described above, and change in shape, modifications, and the like may be performed appropriately.

For example, the positions of the exhaust ports 15d and 15c are not limited to the above and may be provided at any positions below and rearward with respect to the rear seats 5. Furthermore, rather with the exhaust ports, the air that has cooled the battery may be discharged using the gaps of the trim, the gaps between the trim and the carpet, and the like. Moreover, exhaust ports may be provided in the luggage room behind the third row seats 6 as well.

The present disclosure describes a vehicle that is capable of exhausting the air that has cooled the battery in a dispersed manner into a wide area inside the vehicle interior.

A vehicle (a vehicle of an exemplary embodiment described later, for example) according to a first aspect of the exemplary embodiment includes a floor panel (a floor panel of the exemplary embodiment described later, for example), a battery module (a battery module of the exemplary embodiment described later, for example) disposed inside a vehicle interior (a vehicle interior of the exemplary embodiment described later, for example), an exhaust duct (an exhaust duct of the exemplary embodiment described later, for example) that is arranged above the floor panel and that discharges air that has cooled the battery module, in which the exhaust duct is connected to side trims (side trims of the exemplary embodiment described later, for example) on both sides, and air that has been discharged from the exhaust duct is discharged into the vehicle interior from below a rear seat and from a rearward position with respect to the rear seat through spaces (spaces of the exemplary embodiment described later, for example) formed between side members (side members of the exemplary embodiment described later, for example) and the side trims.

According to the first aspect of the exemplary embodiment, since the air that has cooled the battery and that has been discharged from the exhaust duct is discharged into the vehicle interior from below a rear seat and from a rearward position with respect to the rear seat through spaces formed between side members and the side trims, the air can be exhausted in a dispersed manner into a wide area inside the vehicle interior. With the above, discomfort caused to the occupant due to a local temperature increase caused by the air that has cooled the battery can be reduced. Furthermore, discomfort caused to the driver on the driver seat (the front seat), which is where the occupant is most likely to be seated, can be reduced by not discharging the air that has cooled the battery from a portion near the front seat. Moreover, the air that has cooled the battery can be suppressed from being discharged to the upper portion of the vehicle, which is where discomfort is easily felt, by guiding the air that has cooled the battery to the rear portion of the vehicle without having the air pass through the spaces inside pillars.

A vehicle according to a second aspect of the exemplary embodiment may be the vehicle according to the first aspect in which the exhaust duct is connected to the side trims at lower portions of the pillar portions (pillar portions of the exemplary embodiment described later, for example) provided at the sides of the front seats (front seats of the exemplary embodiment described later, for example).

According to the second aspect of the exemplary embodiment, since the exhaust duct is connected to the side trims at the lower portions of the pillar portions provided at the sides of the front seats, the air that has cooled the battery can be discharged into the side trims while suppressing pressure loss.

A vehicle according to a third aspect of the exemplary embodiment may be the vehicle according to the second aspect in which the exhaust duct is connected to the side trims at the lower portions of the pillar portions and in a foot space of the rear seat (a rear seat of the exemplary embodiment described later, for example).

According to the third aspect of the exemplary embodiment, since the exhaust duct is connected to the side trims at the lower portions of the pillar portions provided at the sides of the front seats and in a foot space of the rear seat, the exhausted air can be guided to the rear portion of the vehicle with the exhaust duct.

A vehicle according to a fourth aspect of the exemplary embodiment may be the vehicle according to the third aspect in which the exhaust duct includes a first exhaust port (a first exhaust port of the exemplary embodiment described later, for example) provided at the duct end portion and connected to the side trim, and a second exhaust port (a second exhaust port of the exemplary embodiment described later, for example) provided at a portion between a battery connecting portion (a battery connecting portion of the exemplary embodiment described later, for example) and the duct end portion so as to oppose the floor panel.

According to the fourth aspect of the exemplary embodiment, since the exhaust duct includes the first exhaust port provided at the duct end portion, and the second exhaust port provided in in the underside of the duct at the portion between the battery connecting portion and the duct end portion so as to oppose the floor panel, the air that has cooled the battery can be discharged from a plurality of positions even in a case of a single exhaust duct that has no branch pipes. Furthermore, since the second exhaust port opposes the floor panel, the air that has cooled the battery not only can be discharged while suppressing pressure loss but can be dispersed by using the floor panel.

A vehicle according to a fifth aspect of the exemplary embodiment may be the vehicle according to the fourth aspect further including a carpet (a carpet of the exemplary embodiment described later, for example) disposed above the floor panel so as to cover the exhaust duct, in which a ventilation hole (ventilation hole of the exemplary embodiment described later, for example) is provided in the carpet, and in which air discharged from the second exhaust port passes through a space between the floor panel and the carpet and is discharged into the vehicle interior from the ventilation hole.

According to the fifth aspect of the exemplary embodiment, since the air that has cooled the battery and that has been discharged from the second exhaust port passes through the space between the floor panel and the carpet and is discharged into the vehicle interior from the ventilation hole, the air that has cooled the battery can be exhausted in a further dispersed manner without causing discomfort to the occupant.

A vehicle according to a sixth aspect of the exemplary embodiment may be the vehicle according to the first aspect in which the battery module is disposed in a battery accommodating recess (a battery accommodating recess of the exemplary embodiment described later, for example), the battery accommodating recess being provided under the front seats and in the floor panel in a recessed manner.

According to the sixth aspect of the exemplary embodiment, since the battery module is disposed under the front seats and in the battery accommodating recess provided in the floor panel in a recessed manner, not only a large space can be secured inside the vehicle interior but the front seats can be disposed at low positions.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle comprising:
a floor panel;
a battery module disposed inside a vehicle interior; and
an exhaust duct that is arranged above the floor panel, the exhaust duct discharges air that has cooled the battery module,
wherein the exhaust duct is connected to side trims on both sides,
wherein air that has been discharged from the exhaust duct is discharged into the vehicle interior from below a rear seat and from a rearward position with respect to the rear seat through spaces formed between side members and the side trims, and
wherein the exhaust duct includes:
a first exhaust port provided at the duct end portion and connected to the side trim; and
a second exhaust port provided at a portion between a battery connecting portion and the duct end portion so as to oppose the floor panel.

2. The vehicle according to claim 1,
wherein the exhaust duct is connected to the side trims at lower portions of the pillar portions provided at the sides of the front seats.

3. The vehicle according to claim 2,
wherein the exhaust duct is connected to the side trims at the lower portions of the pillar portions and in a foot space of the rear seat.

4. The vehicle according to claim 3, further comprising:
a carpet disposed above the floor panel so as to cover the exhaust duct,
wherein a ventilation hole is provided in the carpet, and
wherein air discharged from the second exhaust port passes through a space between the floor panel and the carpet and is discharged into the vehicle interior from the ventilation hole.

5. The vehicle according to claim 1,
wherein the battery module is disposed in a battery accommodating recess, the battery accommodating recess being provided under the front seats and in the floor panel in a recessed manner.

6. The vehicle according to claim 1,
wherein the exhaust duct is directly connected to side trims on both sides to discharge the air from the exhaust duct into the spaces formed between side members of the vehicle and the side trims.

7. A vehicle comprising:
a floor panel;
a battery module provided in a vehicle interior;
an exhaust duct to discharge air from the battery module;
a first side trim and a second side trim opposite to the first side trim in a vehicle width direction perpendicular to a front-rear direction of the vehicle;
a first side member and a second side member opposite to the first side member in the vehicle width direction, the first side member being provided along the first side trim to provide a space between the first side member and the first side trim in the width direction, the space being connected to the battery module via the exhaust duct;
a rear seat provided in the vehicle interior;
a first exhaust port connected to the exhaust duct via the space and provided in the vehicle interior below the rear seat in a vehicle height direction perpendicular to the vehicle width direction and the front-rear direction; and
a second exhaust port connected to the exhaust duct via the space and provided in the vehicle interior behind the rear seat in the front-rear direction, the air being discharged from the exhaust duct through the first exhaust port and the second exhaust port via the space,
wherein the exhaust duct includes:
a first exhaust duct port provided at a duct end portion and connected to the first side trim; and
a second exhaust duct port provided at a portion between a battery connecting portion and the duct end portion, the second exhaust duct port opposing the floor panel.

8. The vehicle according to claim 7,
wherein the first side trim and the second side trim are disposed between the first side member and the second side member in the vehicle width direction, and
wherein the exhaust duct is connected to the first side trim.

9. The vehicle according to claim 8,
wherein the exhaust duct is connected to the first side trim at a lower portion of a pillar portion provided at a side of a front seat in the vehicle width direction.

10. The vehicle according to claim 9,
wherein the exhaust duct is connected to the first side trim at the lower portion of the pillar portion and in a foot space of the rear seat.

11. The vehicle according to claim 10,
wherein the exhaust duct is arranged above the floor panel.

12. The vehicle according to claim 11, further comprising:
a carpet disposed above the floor panel so as to cover the exhaust duct,
wherein the carpet has a ventilation hole, and
wherein air discharged from the second exhaust port passes through a space between the floor panel and the carpet and is discharged into the vehicle interior from the ventilation hole.

13. The vehicle according to claim 12,
wherein the battery module is disposed in a battery accommodating recess, the battery accommodating recess being provided under the front seat and in the floor panel in a recessed manner.

14. The vehicle according to claim 7,
wherein the exhaust duct is directly connected to first side trim to discharge the air from the exhaust duct into the space formed between first side member and the first side trim.

15. A vehicle comprising:
a battery module provided in a vehicle interior;
an exhaust duct to discharge air from the battery module;
a first side trim and a second side trim opposite to the first side trim in a vehicle width direction perpendicular to a front-rear direction of the vehicle;
a first side member and a second side member opposite to the first side member in the vehicle width direction, the first side member being provided along the first side trim to provide a space between the first side member and the first side trim in the width direction, the space being connected to the battery module via the exhaust duct;
a rear seat provided in the vehicle interior;
a first exhaust port connected to the exhaust duct via the space and provided in the vehicle interior below the rear seat in a vehicle height direction perpendicular to the vehicle width direction and the front-rear direction; and
a second exhaust port connected to the exhaust duct via the space and provided in the vehicle interior behind the rear seat in the front-rear direction, the air being discharged from the exhaust duct through the first exhaust port and the second exhaust port via the space,
wherein the second side member is provided along the second side trim to provide an additional space between the second side member and the second side trim in the vehicle width direction, the additional space being connected to the battery module via the exhaust duct,
wherein the vehicle further comprises,
a third exhaust port connected to the exhaust duct via the additional space and provided in the vehicle interior below the rear seat in the vehicle height direction; and
a fourth exhaust port connected to the exhaust duct via the additional space and provided in the vehicle interior behind the rear seat in the front-rear direction, the air being discharged from the exhaust duct through the third exhaust port and the fourth exhaust port via the additional space.

* * * * *